United States Patent [19]

Brown et al.

[11] Patent Number: 4,776,805
[45] Date of Patent: Oct. 11, 1988

[54] CARD BIASING DEVICE FOR CARD EDGE CONNECTORS

[75] Inventors: Ricky E. Brown, Millersburg; Daniel L. Gorenc, Harrisburg; Attalee S. Taylor, Palmyra, all of Pa.

[73] Assignee: AMP Incorporated, Harrisburg, Pa.

[21] Appl. No.: 47,221

[22] Filed: May 7, 1987

[51] Int. Cl.⁴ .............................................. H05K 1/00
[52] U.S. Cl. ...................................... 439/64; 439/92; 439/377; 439/676; 439/637
[58] Field of Search ..................... 439/59, 60, 62, 64, 439/65, 66, 74, 377, 260, 262, 325, 327, 328, 329, 92, 97, 108, 632, 630, 631, 635, 636, 637, 374, 78, 79, 80, 81, 374, 676

[56] References Cited
U.S. PATENT DOCUMENTS 3,926,496 12/1975 Occhipinti ........................... 439/377
4,477,138 10/1984 Andrews, Jr. et al. ............... 339/65
4,614,389 9/1986 Albert et al. ........................ 439/374

Primary Examiner—David Pirlot
Attorney, Agent, or Firm—Allan B. Osborne

[57] ABSTRACT

A biasing device for card edge connectors. More particularly, the biasing device is formed from suitable materials and includes as an integral part thereof a spring member which biases the device in the connector.

9 Claims, 6 Drawing Sheets

CARD BIASING DEVICE FOR CARD EDGE CONNECTORS

FIELD OF THE INVENTION

The invention disclosed herein relates to devices for biasing a circuit card towards one end of a card receiving slot in a card edge connector to insure proper registration between the conductive traces or pads on the card and contact elements in the connector.

BACKGROUND OF THE INVENTION

As is well known in the circuit card connecting art, circuit cards made to the identical dimensional specifications will nevertheless vary in width, length and thickness without exceeding manufacturing tolerances. Accordingly, a card slot in a card edge connector must be capable of accepting cards of varying dimensions such that the connector's contact elements accurately engage the proper conductive pads on the edge of the card. One method of achieving this is to bias the card against one end of the card slot; i.e., the datum point. Prior art devices for accomplishing this biasing employ a spring at the opposite end of the slot. Such springs, however, suffer a drawback in that they do not care whether the card is being inserted or withdrawn on a straight line or obliquely. In the latter case, contact elements will engage different pads and, in a power situation, damage can occur to electronic components on the card. Another drawback with springs is that they tend to take a set and lose their ability to properly bias the card against the referenced end.

A solution to these and other problems was found and is disclosed in U.S. Pat. No. 4,477,138, which is incorporated herein by reference. The solution was to provide a sliding member in a passage having a sloping transverse wall at the end of the slot with the member being biased towards the top surface of the connector. The sliding member, or wedge, is driven down the passage by a card being inserted a distance sufficient enough to accommodate the width of that card. Further, a card can only be inserted in a straight line into or from the slot. Since the wedge was not spring biased into the slot, the aforementioned set in spring resiliency is not a problem. The card biasing device of U.S. Pat. No. 4,477,138, shown in FIG. 1 herein, has met with industry acceptance and is commercially successful.

As noted above, the wedge is biased upwardly in its passage with the biasing being provided by a coil spring. Further, the wedge is molded from a plastics material; e.g., polyphenylene oxide. It is now proposed to stamp and form the wedge from a metal and incorporate therein an integral biasing member for urging the wedge upwardly in the passage.

SUMMARY OF THE INVENTION

According to the invention, a circuit card biasing device is provided for card edge connectors having a sloping passage at one end of a card slot. More particularly, the device includes a body portion which is conformably and slidingly received in the sloping passage, a nose projecting forwardly from the body portion and into the card slot. A surface on the nose engages a circuit card inserted into the slot for biasing it towards the opposite end. A spring member, an integral part of the biasing device, extends downwardly from its attachment to the body portion to resiliently engage a backplane or the like on which the connector may be mounted to urge the biasing device upwardly in the passage. The biasing device is preferably stamped and formed from conductive material and may include a contact arm for engaging a ground trace on the circuit card so that a ground is established from the card to the backplane or the like through the body portion and spring member which in turn engages a ground trace on the backplane.

BRIEF DESCRIPTION OF THE DRAWINGS

FIG. 4-B is a top plan view looking into the passage in which the biasing wedge is slidingly positioned;

FIG. 7-B is a top plan view looking into the passage in which the biasing wedge of FIGS. 6 and 7-A is slidingly positioned;

BRIEF DESCRIPTION OF THE PRIOR ART

Figure 1:
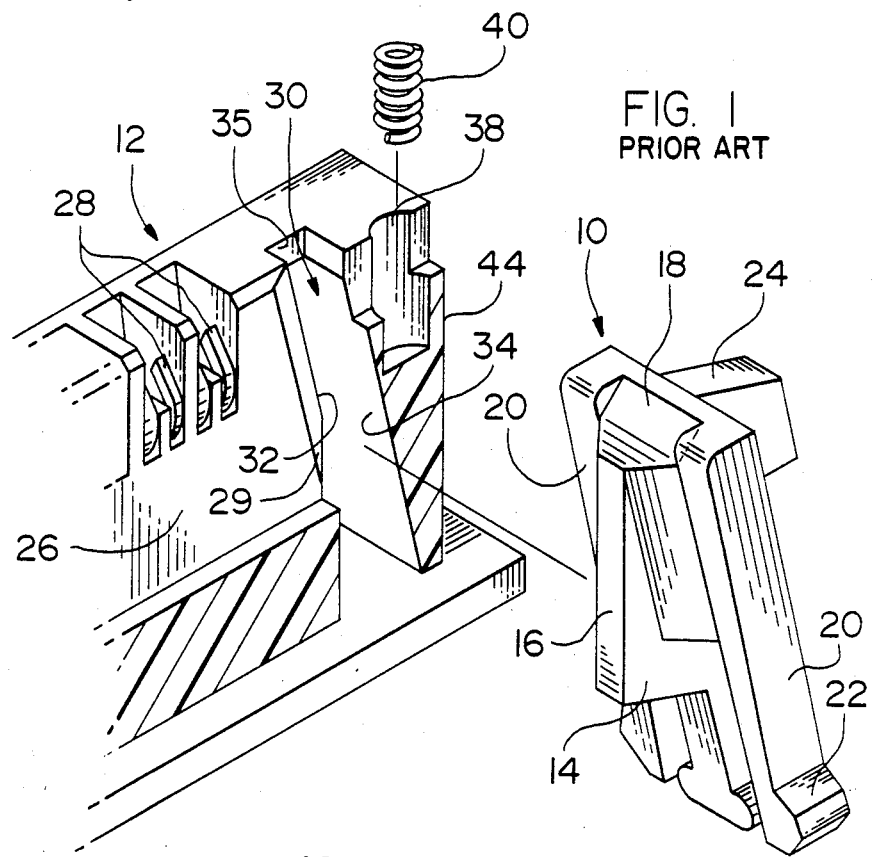
FIG. 1 is a perspective view of the biasing wedge disclosed in U.S. Pat. No. 4,477,138 and of the connector, shown partly sectioned, in which the wedge is employed.
Figure 2:
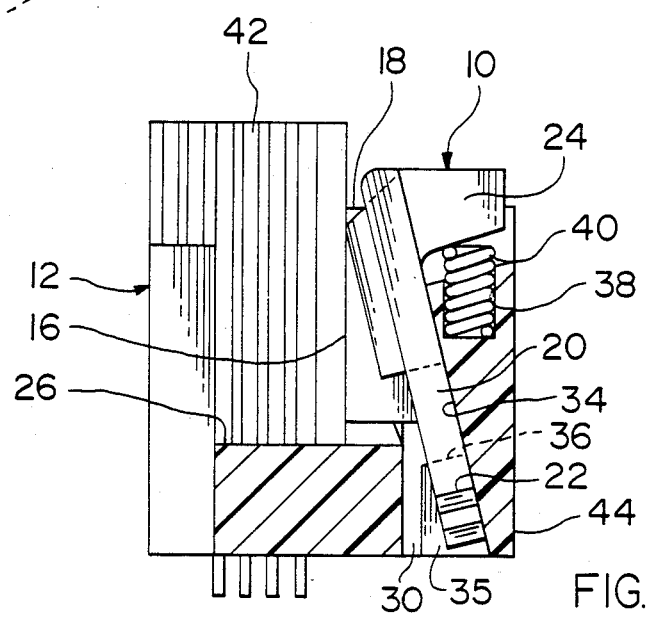
FIG. 2 is a sectioned, side elevational view of the prior art biasing wedge positioned in the connector with a circuit card loaded therein.

FIGS. 1 and 2 illustrate biasing wedge 10 disclosed in U.S. Pat. No. 4,477,138 with wedge 10 shown exploded out of connector 12 in the former Figure. Wedge 10, molded from glass-filled nylon, includes center portion 14 having a card engaging surface 16 with ramp 18 on top thereof. Fingers 20, which are attached to each side of center portion 14, extend downwardly therefrom and are flexible at the lower free ends. Upwardly facing shoulders 22 are provided on outwardly facing sides of fingers 20 adjacent the free ends. Relative to card engaging surface 16, the rear surface of center portion 14 and fingers 20 are at an oblique angle of about twelve and one-half degrees. Arm 24 extends outwardly from the rear surface of center ortion 14 adjacent the top of wedge 10.

Connector 12 includes card slot 26 and a plurality of contact elements 28 extending into slot 26 from both sides thereof. One end of slot 26; i.e., a far end wall thereof (not shown), provides a datum point. A vertical opening 29 extends from slot 26 into passage 30. Passage 30 includes sloping front and rear walls 32, 34 respectively which are transverse to the longitudinal axis of slot 26. Side walls 35 include downwardly facing shoulders 36, shown in phantom in FIG. 2, which cooperate with shoulders 22 to retain wedge 10 in passage 30. The angle of walls 32, 34, relative to a vertical axis is twelve and one-half degrees so that with wedge 10 conformably received in passage 30 as shown in FIG. 2, card engaging surface 16 is parallel to the far end wall of slot 26. Cavity 38, located behind passage 30, receives coil spring 40 which biases wedge 10 upwardly in passage 30 by engaging arm 24 as shown in FIG. 2.

As shown in FIG. 2, wedge 10 is slidingly positioned in passage 30 with spring 40 biasing it upwardly. Surface 16 projects into slot 26 through vertical opening 29 in transverse wall 32.

Circuit card 42 is shown inserted into card slot 26. As the card was being inserted, one corner thereof engaged ramp 18 on wedge 10, pushing wedge 10 down sloping passage 30 and simultaneously towards end 44 of connector 12; i.e., towards the right hand side of FIG. 2. By moving wedge 10 down and laterally, surface 16 is moved out of slot 26 by a distance only necessary to permit card 42 to slide off ramp 18 and into slot 26 along side and parallel to surface 16 as shown. This particular aspect of the functioning of wedge 10 and wedge 50 of the present invention will be described in greater detail later.

DESCRIPTION OF THE INVENTION

Figure 3:
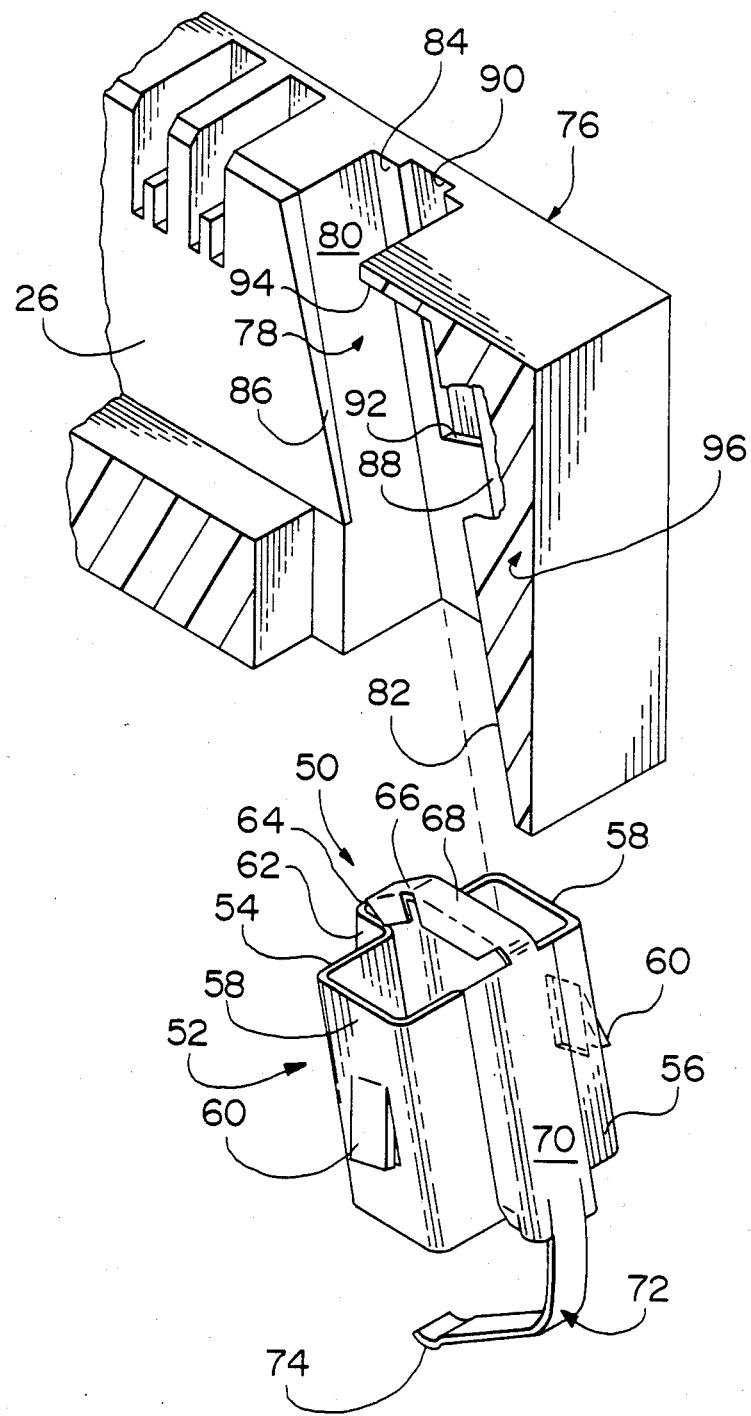
FIG. 3 is a perspective view of the biasing wedge constructed in accordance with one embodiment of the present invention and of the connector, shown partly sectioned, in which the biasing wedge is employed.
Figure 8:
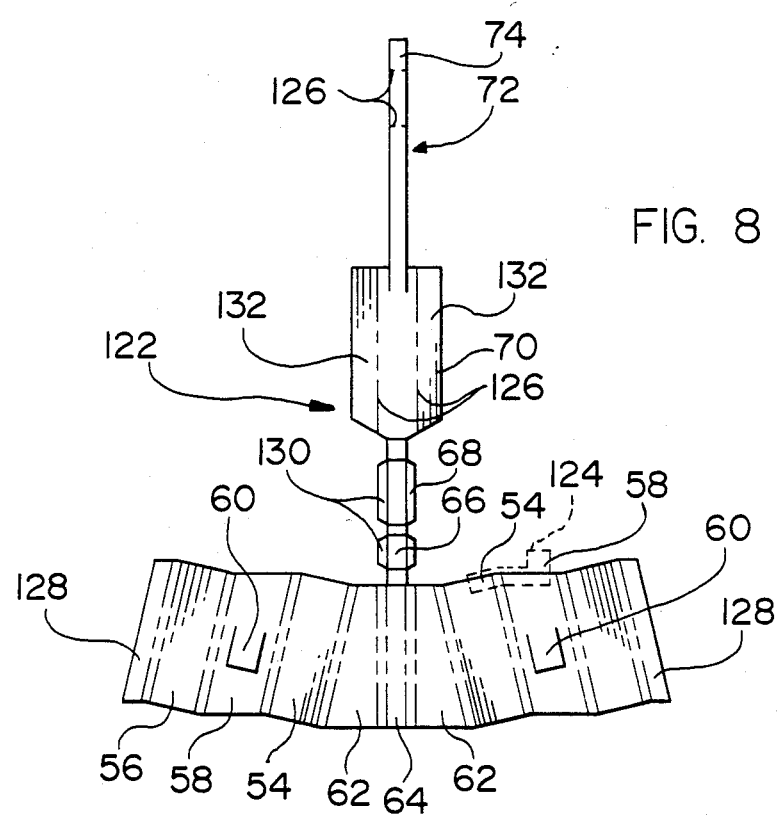
FIG. 8 is a plan view of a blanked out biasing wedge of the present invention.

Referring to FIG. 3, biasing wedge 50 of the present invention is stamped and formed from a suitable metal such as phos bronze or stainless steel. The metal, after being blanked out as shown in FIG. 8, is formed to include body portion 52 having parallel front and rear walls 54, 56 respectively and parallel side walls 58. Provided on both side walls 58 are retaining ears 60 which project outwardly and downwardly. Nose 62, attached to and projecting forwardly from front wall 54, includes forwardly facing surface 64 for engaging a side of a circuit card. Surface 64 and body portion 52 are at an optimum twelve and one-half degree angle relative to each other. As noted in U.S. Pat. No. 4,477,138, that angle can be from about seven to about thirty degrees.

Ramp 66 provides a sloping surface leading to nose surface 64. Ramp 66 is supported by being attached to nose 62 and to strap 68 which leads to a channel shaped member 70 which extends down the center of rear wall 56 and in fact, receives the wrapped around free ends of the blank (FIG. 8) which form walls 54, 56, 58 and nose 62. Spring member 72, attached to member 70, extends down and in under body portion 52 with a convex surface 74 at its free end facing away from body portion 52.

Card edge connector 76 is similar to connector 12 shown in FIGS. 1 and 2 except for a modified passage 78 and the absence of a coil spring receiving cavity.

Sloping passage 78 is defined by parallel front and rear walls 80, 82 respectively which are transverse to card receiving slot 26, and side walls 84. Vertical opening 86, through front wall 80, provides access to slot 26 from passage 78. Channel 88 is provided in rear wall 82. Grooves 90 in side walls 84 provide upwardly facing shoulders 92. As shown, portion 94 of connector housing 96 overhang passage 78 to limit the upward travel of wedge 50. Passage 78 extends through the thickness of housing 96 at a preferred angle of twelve and one-half degrees relative to the vertical.

With references to FIG. 4-A along with FIG. 3, wedge 50 is loaded into passage 78 from below with the fit being such that wedge 50 slides freely but does not wobble. Ramp 66 faces obliquely upwardly; i.e., towards the top surface of housing 96 and spring member 72 extends downwardly towards the opposite or bottom surface. Body portion 52 occupies the space in passage 78 between front and rear walls 80, 82 respectively and side walls 84. Channel shaped member 70 is received in channel 88 in the passage's rear wall 82. Nose 62 projects into slot 26 through opening 86. With body portion 52 and member 70 being in sloping passage 78, surface 64 on nose 62 is parallel relative to the far or facing end wall (not shown) of slot 26; i.e., parallel to the vertical.

Wedge 50 is confined within passage 78 by retaining ears 60 engaging upwardly facing shoulders 92 defined by grooves 90 in passage side walls 84 and by overhanging portion 94 of connector housing 96.

Figure 4A:
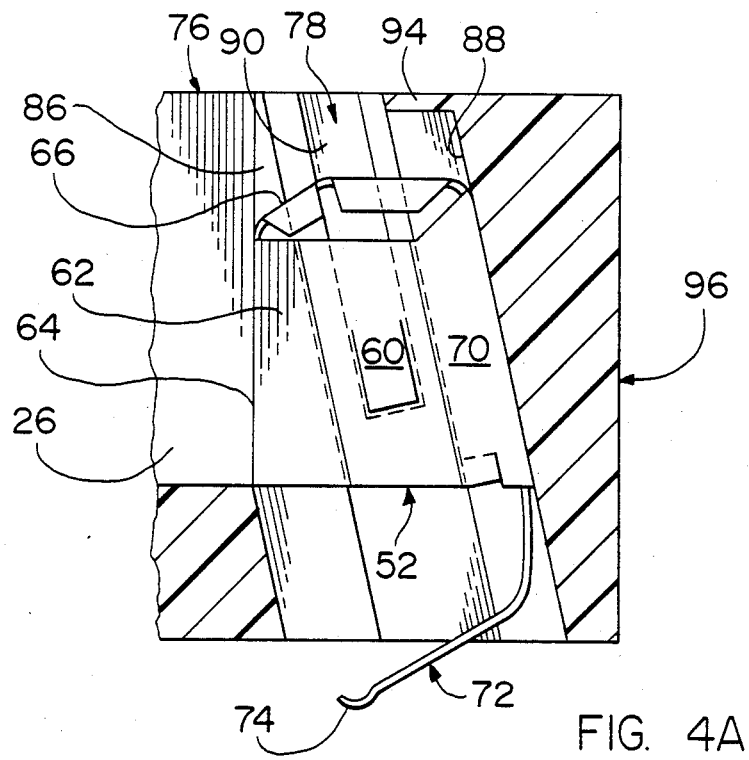
FIG. 4-A is a sectioned, side elevational view of the biasing wedge of the present invention shown positioned in the connector.
Figure 4B:
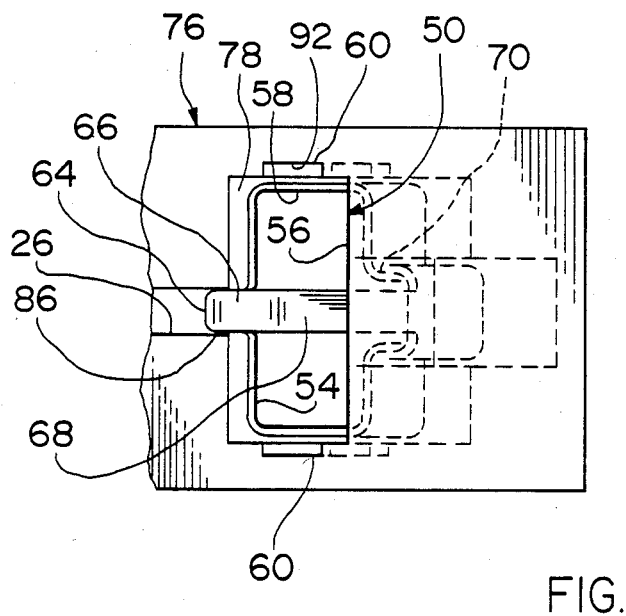

FIG. 4-B, a top plan view, includes phantom lines representing successive cuts across passage 78 to illustrate its continued horizontal displacement away from slot 26. Thus, as wedge 50 is moved down passage 78, nose 62 and more particularly surface 64 thereon gradually recedes through opening 86.

Figure 5:
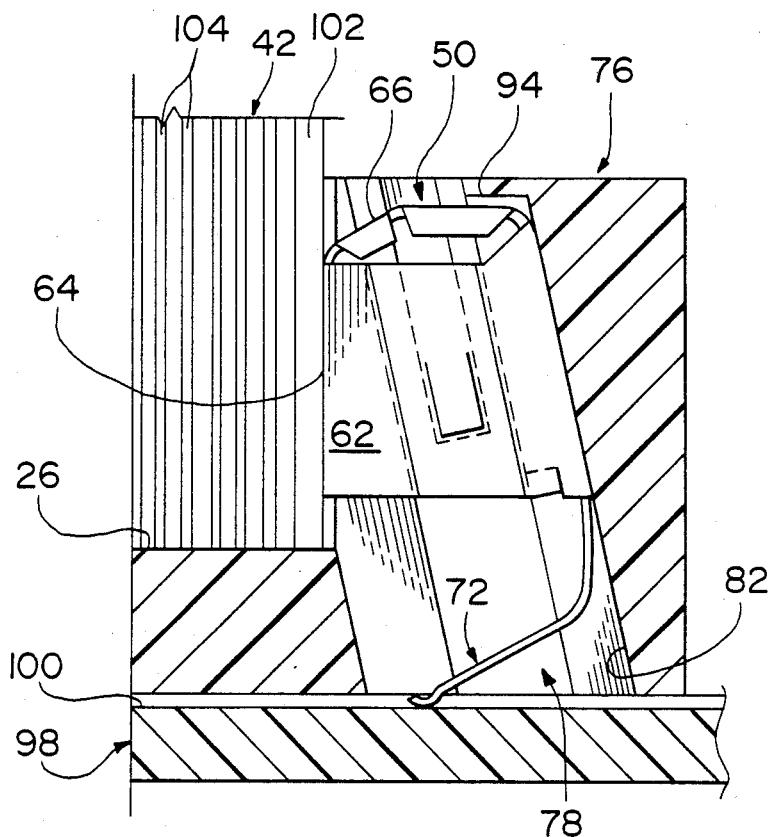
FIG. 5 is a sectioned, side elevational view showing the connector of FIG. 4-A mounted on a backplane or circuit board and with a circuit card inserted into the card slot of the connector.

FIG. 5 shows connector 76 mounted on backplane 98 and with circuit card 42 inserted into slot 26. On mounting connector 76, spring member 72 engages top surface 100 of backplane 98 to bias wedge 50 upwardly in passage 78 against overhang portion 94. In that position, nose 62 with surface 64 thereon extends into slot 26 to a distance such that the length between surface 64 and the far end wall of slot 26 is just sufficient to receive a circuit card 42 meeting the minimum width permitted by manufacturing tolerances.

For purposes of illustrating the function of wedge 50 and sloping passage 78, card 42 is presumed to have a width required by the specifications; i.e., zero tolerance. Accordingly, as card 42 enters slot 26, corner 102 thereof first engages ramp 66 on wedge 50. On pushing card 42 down, wedge 50 is moved down passage 78 and nose 62 backs out of slot 26 far enough for card 42 to enter. Concurrently, card 42 is biased against the datum point; i.e., the far end wall of slot 26 so that contact elements 28 in connector 76 electrically engage the proper traces 104 on card 42. With the length of slot 26 now equal to the card width, card 42 slides off ramp 66 and down along side surface 64 of now stationary wedge 50; i.e., in the absence of a force on wedge 50, spring member 72, which has been resiliently compressed between backplane 98 and the downwardly moving wedge 50, will maintain wedge 50 in the position reached as shown in FIG. 5. During such compressing, spring member 72 will slide along top surface 100 of backplane 98 for a short distance, a point having more significance with regard to the embodiment of the invention shown in FIGS. 6 and 7-A, 7-B.

Should card 42 have the maximum width permitted, wedge 50 would have been pushed farther down passage 78 until nose 62 and surface 64 is just out of slot 26.

Another important feature of the present invention and of the prior art device shown in FIGS. 1 and 2 is that card 42 can only be withdrawn from slot 26 in a straight line. This feature prevents lengthwise movement in the slot during an angled withdrawal which could cause contact elements 28 (FIG. 1) to momentarily touch the wrong traces.

Figure 6:
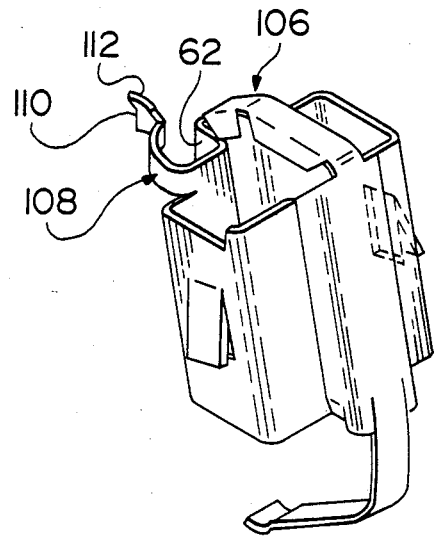
FIG. 6 is a perspective view of the biasing wedge constructed in accordance with another embodiment of the present invention.
Figure 7A:
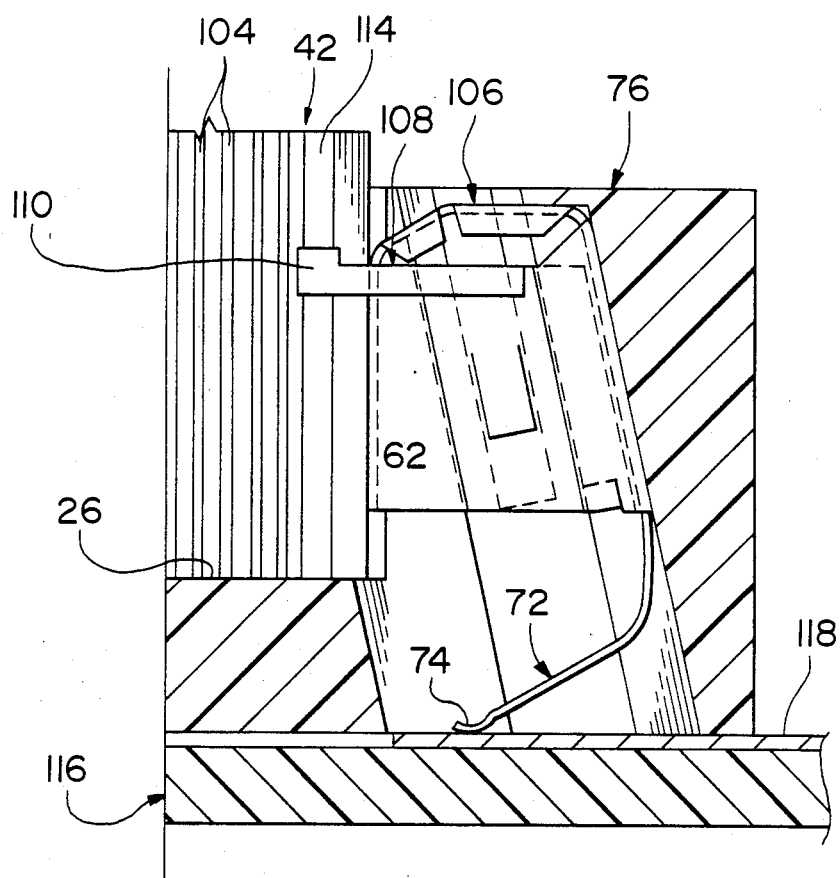
FIG. 7-A is a sectioned, side elevational view of the biasing wedge of FIG. 6 shown positioned in a connector mounted on a backplane or circuit board and with a circuit card inserted into the card slot of the connector.
Figure 7B:
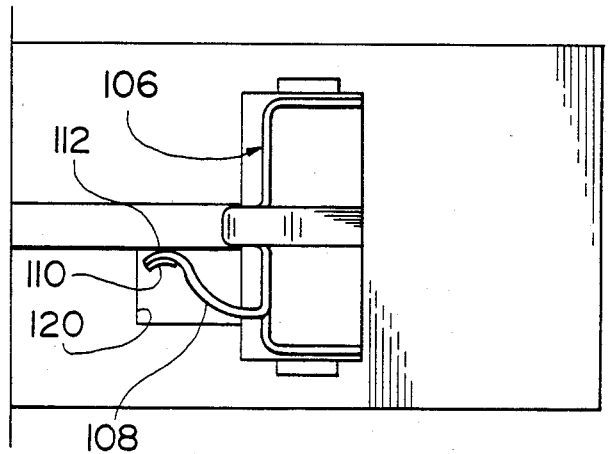

As shown in FIGS. 6, 7-A and 7-B, another embodiment is wedge 106 which is the same as wedge 50 in all respects except for the presence of grounding contact arm 108. Arm 108, which is blanked out from body portion 52, is formed to curve around in towards nose 62 so that arcuate-shaped free end 110 will extend into slot 26 as shown in FIG. 7-B. The convex surface 112 on end 110 engages ground trace 114 on card 42 as shown in FIG. 7-A and accordingly may be plated. The top edge of free end 110 is bent back out to provide a lead-in for card 42 to prevent stubbing. The width of the arcuate-shaped free end 110 is such as to maintain contact with trace 114 on any width card 42. Backplane 116 shown in FIG. 7-A includes a grounding trace 118 which convex surface 74 on spring member 72 electrically engages to ground card 42. As wedge 66 is pushed down by circuit card 42 entering slot 26, convex surface 74 will slide across trace 118, wiping it clean to provide a better conductive path therebetween.

Connector 76 requires that notch 120 be provided in one side wall of slot 26 for arm 108 on wedge 106 as shown in FIG. 7-B. The presence of notch 120 does not prohibit the use of wedge 50 in the modified connector 76.

FIG. 8 shows blank 122 which after forming becomes wedge 50 or wedge 106; i.e., phantom lines 124 form grounding contact arm 108 on wedge 106. The several structural features of formed wedge 50 are indicated with the same reference numerals. Fold and bend lines are indicated by reference numeral 126. The view illustrates the method of cutting body portion 52 so that it is at an angle relative to card side engaging surface 64; i.e., the sides of the panels which will become front and rear walls 54, 56 respectively are at an angle of 12.5 degrees relative to the sides of the panels which will become nose 62, surface 64 and side walls 58. The drawing also shows free edges 128 of body portion 52 which are folded into channel member 70 as noted above. The steps of folding blank 122 preferably begins with pushing ears 60 outwardly. Next, body portion 52 is formed, beginning with nose 62 and ending with free edges 128 being parallel to each other and projecting rearwardly. The supporting sides 130 of strap 68 are next folded down and channel member 70 formed by bending in sides 132. Thereafter, strap 68 and member 70, along with nonformed spring member 72, are folded over and down so that ramp 66 is at the appropriate slope and member 70 is against rear wall 56 with free edges 128 received thereinto. Finally, convex surface 74 on spring member 72 is formed and member 72 is bent to curve in under body portion 52.

With regard to wedge 106, contact arm 108 would be formed into position at some stage after forming body portion 52.

Figure 9:
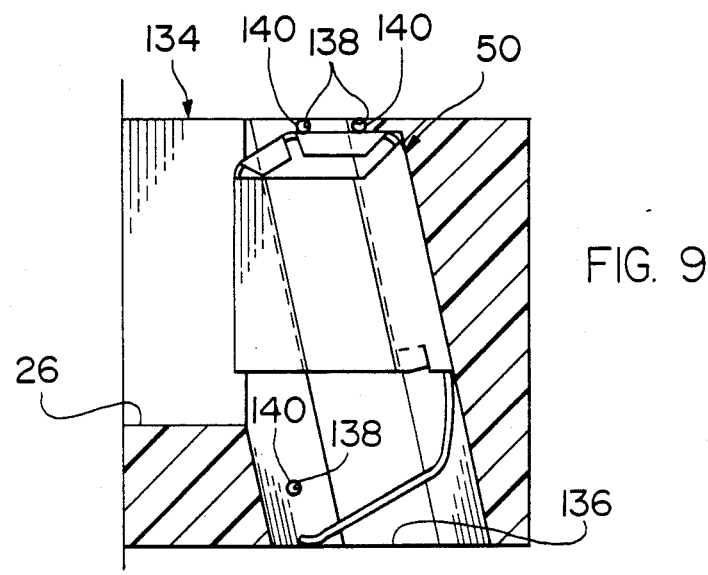
FIG. 9 is a sectioned, side elevational view of still another embodiment of the present invention.

FIG. 9 shows a modified connector 134 in which floor 136 has been added to passage 78. Further, overhang portion 94 of housing 96 has been removed and removable bars 138, retained in holes 140 cross the top of passage 78 to confine wedge 50 therein. In this embodiment, grooves 90 in side walls 84 and ears 60 on body portion 52 are not required. In the alternative, bar 138', crossing passage 78 adjacent the lower end, could be used instead of floor 136.

As can be discerned, a circuit card biasing device for use in card edge connectors has been disclosed. The device is stamped and formed and includes a body portion slidably received in a sloping passage at one end of a card slot in the connector. A nose with a vertically extending surface thereon is attached to the body portion and extends into the card slot to engage a side of a circuit card as it is inserted into the slot to bias it against the far end wall. Cards having a greater than a predetermined width are accommodated in the slot by the biasing device being driven down the sloping passage to withdraw the nose from the slot to the extent necessary. The biasing device includes as an integral part thereof a spring member which urges the device towards the upper end of the passage. The biasing device includes a second embodiment having a grounding contact arm to provide a means for grounding a circuit card to a backplane on which the connector is mounted prior to the mating of signal contacts.

We claim:

1. A circuit card biasing device for card edge connectors of the type having a sloping passage at one end of a card receiving slot, said device comprising body means for being slidably received in the sloping passage, nose means attached to and projecting from said body means for extending into the slot, a surface on said nose means for engaging a side of a circuit card inserted into the slot to thereby bias the card against a far end wall of the slot and spring means attached to and extending from said body means for resiliently engaging a backplane on which the connector may be mounted to thereby urge said body means in the passage away from said backplane.

2. The biasing device of claim 1 further including retaining means on said body means for cooperating with the passage to retain said body means therein.

3. The biasing device of claim 1 made by stamping and forming processes.

4. The biasing device of claim 1 wherein said body means and said surface on said nose means are at a relative angle to each other ranging from about seven to about thirty degrees.

5. The biasing device of claim 1 wherein said body means and said surface on said nose means are at an angle of twelve and one-half degrees relative to each other.

6. The biasing device of claim 1 wherein said biasing device further includes ramp means located over said nose means and leading to said surface thereon.

7. The biasing device of claim 1 wherein said spring means is curved and includes an arcuate shaped free end with the convex surface thereof adapted to engage the surface of the backplane.

8. A circuit card biasing device for card edge connectors of the type having a sloping passage at one end of a card receiving slot, said device comprising body means of a conductive material for being slidably received in the sloping passage, nose means attached to and projecting from said body means for extending into the slot, a surface on said nose means for engaging a side of a circuit card inserted into the slot to thereby bias the card away from the passage, spring means for urging said body means towards one end of the passage and a grounding contact arm, attached to said body means, extending into the slot, and having a free end adapted to slidingly engage a ground trace on a surface of the card.

9. The biasing device of claim 8 further including grounding means on said body means for engaging a ground trace on a backplane on which the card edge connectors may be mounted.

* * * * *